United States Patent [19]

Gerrish, Jr. et al.

[11] Patent Number: 4,458,595
[45] Date of Patent: Jul. 10, 1984

[54] ABLATIVE LINER

[75] Inventors: Howard W. Gerrish, Jr.; Ronald F. Vetter; George F. Sieg; Harold L. Bennett, all of Ridgecrest, Calif.

[73] Assignee: The United States of America as represented by the Secretary of the Navy, Washington, D.C.

[21] Appl. No.: 385,630

[22] Filed: Jun. 7, 1982

[51] Int. Cl.³ .................................................. F42B 1/00
[52] U.S. Cl. ..................................... 102/290; 60/253; 264/3 R
[58] Field of Search .................... 102/290; 60/253; 264/3 R

[56] References Cited

U.S. PATENT DOCUMENTS

| | | | |
|---|---|---|---|
| 3,210,233 | 10/1965 | Kummer et al. | 161/68 |
| 3,347,047 | 10/1967 | Hartz et al. | 60/253 |
| 3,636,881 | 1/1972 | Godfrey | 102/290 |
| 3,650,102 | 3/1972 | Economy et al. | 57/140 R |
| 4,034,676 | 7/1977 | Daume | 102/290 |
| 4,042,441 | 8/1977 | Wasserman et al. | 102/290 |
| 4,185,557 | 1/1980 | Gerrish, Jr. | 102/103 |
| 4,232,608 | 11/1980 | Wrightson | 102/290 |
| 4,254,177 | 3/1981 | Fulmer | 428/256 |
| 4,316,969 | 2/1982 | Koyama et al. | 525/145 |
| 4,375,522 | 3/1983 | Braun | 102/290 |

*Primary Examiner*—Edward A. Miller
*Attorney, Agent, or Firm*—Robert F. Beers; W. Thom Skeer; Bruce H. Cottrell

[57] ABSTRACT

An improved rocket motor has a first layer of silicone rubber and a second layer of an ablative lining placed between the rocket motor casing and the propellant grain. The ablative lining layer contains chopped novoloid fibers 14 microns in diameter and nominally 1 mm in length interspersed throughout a polymeric composition.

5 Claims, 3 Drawing Figures

ABLATIVE LINER

BACKGROUND OF THE INVENTION

1. Field of the Invention

This invention relates to the liners for end burning solid rocket propellant motors. More particularly, this invention relates to an ablative liner. Additionally, this invention relates to a liner which reduces the coning effect in end burning solid rocket propellant motors.

2. Description of the Prior Art

The coning of a solid rocket propellant grain has been a problem in prior end burning rocket motors. Coning results from the more rapid burning of propellant grain near the casing than in the center of the motor. Various liners have been used to protect rocket motor casings from the heat evolved during burning and certain liners can help reduce coning. Some liners, containing fiberous materials such as asbestos, give increased protection against high temperatures by functioning as ablators. The use of asbestos, however, has raised enviromental concerns due to its carcinogenic effects. An asbestos free ablative liner which reduces the coning of the burning propellant grain has been sought.

SUMMARY OF THE INVENTION

This invention employs noncarcinogenic fibers of novoloid mixed in a polymeric rubber liner. Upon burning of the propellant, the novoloid fibers resist burning and produce a charred mat of carbonized fibers. This charred mat gives additional protection from the high temperature exhaust gases to the motor casing. It is an object of the present invention to provide an improved ablative liner for rocket motors.

A further object of this invention is to provide an ablative lining which reduces the coning of the propellant and the amount of carcinoginic by-products.

Another object of the invention is to provide a method of manufacturing a rocket motor utilizing the ablative liner. These and other objects of the invention will become more readily apparent from the ensuing specification when taken together with the drawings.

DESCRIPTION OF THE PREFERRED EMBODIMENT

Figure 1:
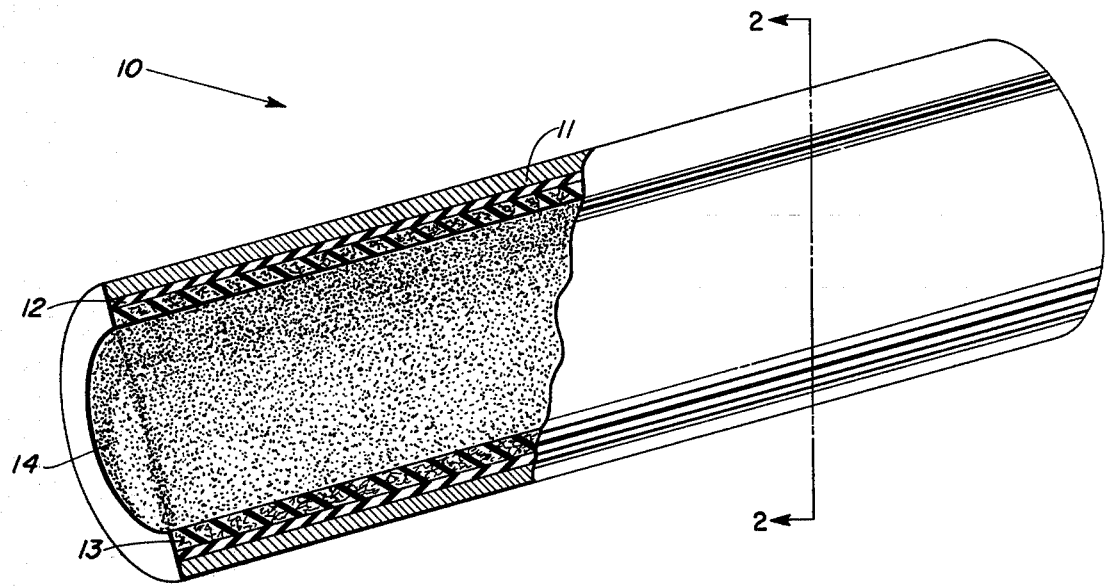
FIG. 1 is a cross-sectional view of a rocket motor.

Referring to FIG. 1, a rocket motor 10 is shown as including a casing 11, which is constructed from steel or any other suitable metal. Adjacent to casing 11 is a thin layer of silicone rubber 12. By applying a silicone rubber primer to casing 11, a strong bond may be achieved to silicone rubber 12. An ablative lining 13 is shown interior to silicone rubber 12. Lining 13 is made from a combination of a prepolymer and a premix. Their required ingredients include polypropylene glycol (PPG), N-Mono(hydroxyethyl)-N,N',N'-tris(2-hydroxypropyl) ethylenediamine (MTDA), tolylene-2,4-diisocynate (TDI), N-phenyl-N'-cyclohexyl-p-phenylenediamine (PCHPDA), titanium dioxide, activated ferric acetylacetonate (FeAA), and novoloid fibers which are cross-linked phenol-formaldehyde. The nominal chemical composition of lining 13 is as follows:

| Constituent | % by Weight |
| --- | --- |
| PPG | 74.50 |
| MTDA | 1.00 |
| TDI | 10.38 |
| PCHPDA | 0.62 |
| $TiO_2$(ground) | 10.00 |
| Fibers (1 millimeter in length and 14 microns in diameter) | 2.00 |
| FeAA (activated) | 1.50 |

A rocket propellant grain 14 fills the inner core within lining 13.

In operation lining 13 bonds to grain 14, but does not bond to silicone rubber 12. By releasing from casing 11, lining 13 and propellant 14 remain in a low stress condition, because they are free to contract and expand independently of casing 11 during temperature changes. Lining 13 serves to protect the surface of grain 14 from the hot gases circulating within the motor during combustion, preventing backside grain ignition. Further, lining 13 ablates as the end burning grain face advances along the length of casing 11. The remaining char mat containing carbonized novoloid fibers helps protect the sidewalls of casing 11 from the high temperature exhaust gases.

Figure 2:
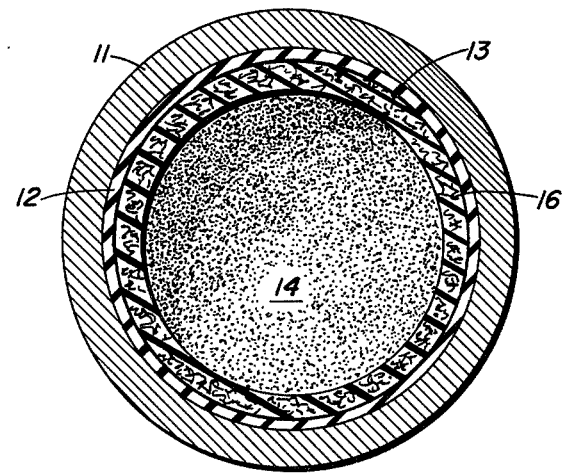
FIG. 2 is a view taken along line 2—2 of FIG. 1 showing the fibers throughout the liner.

Referring to FIG. 2, the novoloid fibers 16 are shown interspersed throughout lining 13.

Figure 3:
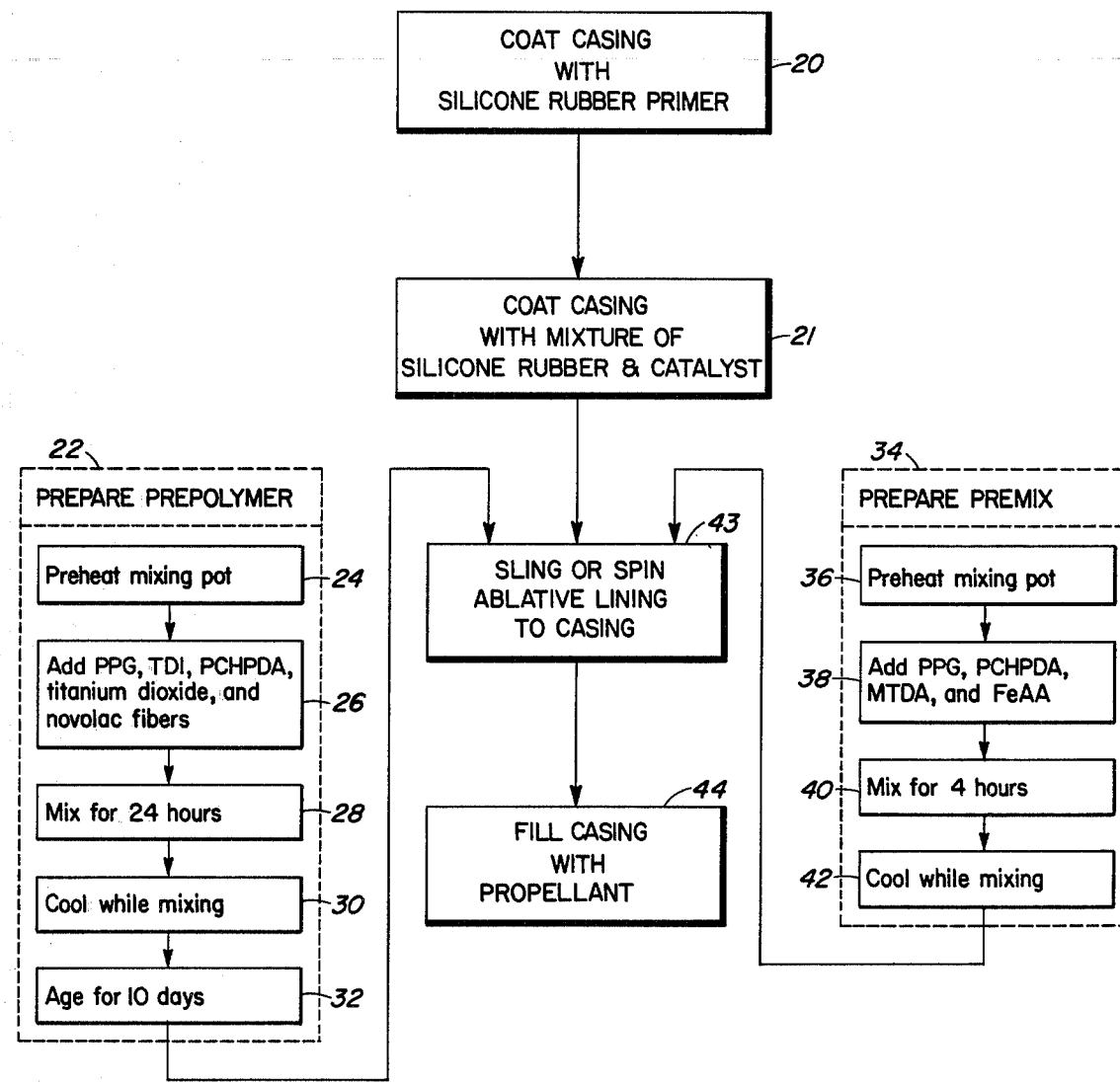
FIG. 3 is a flow diagram of a method of production.

Referring to FIG. 3, the flow diagram illustrates a method of manufacture of the invention. A silicon rubber primer is applied as indicated by box 20 to a clean motor casing 11 and allowed to run the full length of the case. The casing is spun by any suitable method to spread the primer evenly over the inner surface of the casing. The primer is air dried at ambient conditions for at least one hour, the primer effects a strong bond between the case interior wall and the silicone rubber. Silicone rubber is mixed with suitable catalyst, poured into the casing and then spread over the casing at a nominal length of 0.005 inches by means of a paint brush, roller, or other suitable means as indicated by box 21. The casing is spun and heated to cure the silicone rubber layer. A suitable temperature has been found to be 90° F. when spinning is for 24 hours.

Next, the prepolymer and premix are prepared. The percentages of ingredients in the prepolymer and premix are dependent upon the laboratory determined values of hydroxyl equivalents per hundred grams of PPG and isocyanate equivalents per hundred grams of TDI. Typically, these numbers vary with different lots of PPG and TDI and thus the percentages of ingredients in the prepolymer and premix change whenever there is a lot change in PPG or TDI.

Four equations have been developed to describe the quantities of the required ingredients as parts of a 200-part system of prepolymer and premix. The amount of the PCHPDA, $TiO_2$, FeAA and the novoloid fibers are kept at a constant total value of 28.24 parts of a 200 part system. The equations with experimentally developed constants are:

$$A + B + Y + Z = 171.76;$$

$$\frac{ZE_z}{(A + B)E_x + YE_y} = 1.220;$$

$$\frac{(A + B)E_x}{YE_y} = 5.751; \text{ and}$$

$$\frac{ZE_z}{BE_x} = 3.782; \text{ where}$$

A=PPG in Premix (parts/200);
B=PPG in Prepolymer (parts/200);
Y=MTDA in Premix (parts/200);
Z=TDI in Prepolymer (parts/200);
$E_x$=Hydroxyl (OH) equivalents/100 grams of PPG;
$E_z$=Isocyanate (NCO) equivalents/100 grams of TDI; and
$E_y$=Hydroxyl (OH) equivalents/100 grams of MTDA=1.437 (theoritical value).

The four equations are solved simultaneously for A, B, Y and Z. Then, $K_1$ and $K_2$ are calculated with $$K_1 = \frac{100}{B + Z + 24.8}$$

$$K_2 = \frac{100}{A + Y + 3.44}$$

This allows the percentages of each ingredient in the respective prepolymer and the premix to be determined. Additionally, $K_2/K_1$ defines the mix ratio of prepolymer to premix required to produce lining 13.

| Ingredient | Prepolymer % | Premix % |
|---|---|---|
| PPG | $BK_1$ | $AK_2$ |
| MTDA | — | $YK_2$ |
| TDI | $ZK_1$ | — |
| PCHPDA | $0.8K_1$ | $0.44K_2$ |
| TiO$_2$ | $20.0K_1$ | — |
| Novoloid fibers | $4.0K_1$ | — |
| FeAA | — | $3.0K_2$ |

To prepare the prepolymer as indicated by box 22, a mixing pot is preheated, as shown in box 24, by a water jacket for at least 30 minutes at 95° F. to 105° F. Preground titanium dioxide is screened through a number 10 mesh Tyler screen. Both the titanium dioxide and the novoloid fibers are preheated at 170° F. to 190° F. for a minimum of 24 hours prior to mixing.

As indicated by box 26, the next step in prepolymer preparation 22 is to add the PPG, TDI, PCHPDA, titanium dioxide and the novoloid fibers to the preheated pot. Then, as shown in box 28, mixing is conducted under a nitrogen atmosphere. Following about 24 hours of mixing in box 28 with the water jacket at 150° F., chilled water of about 50° F. is introduced into the water jacket to cool the mixture as indicated by box 30. The mixing is continued until the product temperature reaches 120° F. to 130° F. The prepolymer is then poured into cans of suitable size and aged, as indicated by box 32, for ten days at 70° F. to 80° F. The prepolymer should then be stored in refrigeration between 35° F. and 45° F.

To prepare the premix as indicated by box 34, a mixing pot is preheated, as shown in box 36, by a water jacket for at least 60 minutes at 175° F. to 185° F. The FeAA is activated by heating for eighteen days while exposed to slowly circulating air at 175° F. to 185° F. It is screened through a number 32 mesh Tyler screen and preheated at 175° F. to 185° F. for a minimum of 24 hours prior to mixing.

As indicated by box 38, the next step in premix preparation 34 is to add the PPG, PCHPDA, MTDA and FeAA to the preheated pot. Then, as shown in box 40, mixing is conducted under a vacuum ($\sim$5 mm Hg). Following about 4 hours of mixing with the water jacket at 180° F., chilled water of about 50° F. is introduced into the water jacket to cool the mixture as indicated by box 42. The mixing is continued until the product temperature reaches 140° F. to 145° F. The premix is poured into one gallon cans for convenience and stored at an ambient temperature of 60° to 95° F.

Both the premix and the prepolymer should be used within ninety days of preparation. After the preparation of the premix and the prepolymer, the ablative lining can be applied to the casing 11 over the silicone rubber layer 12. As indicated by box 43, the ablative lining is most effectively applied by sling lining. Any other suitable method, such as spin lining, maybe substituted. The final step, as indicated by box 44, is to cast the grain 14 into the rocket motor.

One specific mixture tested and found suitable had the following composition:

| Ingredient | Prepolymer (%) | Prepolymer (weight) | Premix (%) | Premix (weight) |
|---|---|---|---|---|
| PPG | 55.3257 | 93.29 lbs | 94.4487 | 153.07 lbs |
| MTDA | — | — | 2.0417 | 1500.9 grams |
| TDI | 20.3557 | 34.32 lbs | — | — |
| PCHPDA | 0.7845 | 600.0 grams | 0.4489 | 330.0 grams |
| TiO$_2$ (Ground) | 19.6114 | 33.07 lbs | — | — |
| Fibers (Kynol) | 3.9223 | 3000.0 grams | — | — |
| FeAA (Activated) | — | — | 3.0606 | 2250.0 grams |
| | 100.000% | 76,486 grams | 100.000% | 73,514 grams |

The prepolymer was mixed with the premix for these particular batches in a ratio of 1.0404 parts prepolymer per part premix.

The foregoing description taken together with the appended claims constitute a disclosure such as to enable a person proficient in the rocket motor arts and having the benefit of the teachings contained therein to make and use the invention.

Obviously, many modifications and variations of the present invention are possible in the light of the above teachings; and, it is understood that within the scope of the disclosed inventive concept, the invention may be practiced otherwise than specifically described.

What is claimed is:

1. An improved end burning rocket motor having reduced propellant grain coning and diminished carcinogenic by-products comprising:
   a tubular shaped casing having an inner surface,
   a silicone rubber layer on said surface;
   an ablative lining on said layer made from a mixture of
      about 74.5 percent by weight polypropylene glycol,
      about 1.0 percent by weight N-Mono(hydroxyethyl)-N,N',N'-tris(2-hydroxypropyl)ethylenediamine,
      about 10.38 percent by weight toluene-2,4-diisocyanate,
      about 0.62 percent by weight N-phenyl-N'-cyclohexyl-p-phenylenediamine,
      about 10.0 percent by weight TiO$_2$,
      about 2.0 percent by weight novoloid fibers, and
      about 1.5 percent by weight ferric acetylacetonate; and
   propellant grain bonded to said lining.

2. An improved rocket motor according to claim 1 wherein said fibers are nominal length of 1 mm and diameter of 14 microns.

3. A method of producing a rocket motor having reduced propellant grain coning and diminished carcinogenic by-products comprising:

coating the inner surface of a rocket motor casing with a layer of silicone rubber;

applying a mixture of about 74.5 percent by weight polypropylene glycol, about 1.0 percent by weight N-mono(hydroxyethyl)-N,N',N'-tris(2-hydroxypropyl)ethylenediamine, about 10.38 percent by weight toluene-2,4-diisocyanate, about 0.62 percent by weight N-phenyl-N'-cyclohexyl-p-phenylenediamine, about 10.0 percent by weight $TiO_2$, and 2.0 percent by weight novoloid fibers; and about 1.5 percent by weight ferric acetylacetonate on said layer; and pouring a propellant grain in remainder of said casing.

4. A method of producing a rocket motor according to claim 3 wherein said step of applying a mixture includes the sling lining of said mixture.

5. A method of producing a rocket motor according to claim 3 wherein said step of applying a mixture includes the spin lining of said mixture.

* * * * *